United States Patent [19]

Kajiyama et al.

[11] 4,446,946
[45] May 8, 1984

[54] ELEVATOR SPEED INSTRUCTION GENERATING SYSTEM

[75] Inventors: Ryuichi Kajiyama; Masashi Yonemoto, both of Aichi, Japan

[73] Assignee: Mitsubishi Denki Kabushiki Kaisha, Tokyo, Japan

[21] Appl. No.: 313,404

[22] Filed: Oct. 21, 1981

[30] Foreign Application Priority Data

Oct. 21, 1980 [JP] Japan ............................. 55-147315

[51] Int. Cl.³ ............................................. B66B 1/18
[52] U.S. Cl. ............................................. 187/29 R
[58] Field of Search ........................................ 187/29

[56] References Cited
U.S. PATENT DOCUMENTS

| | | | |
|---|---|---|---|
| 4,124,103 | 11/1978 | Otto et al. | 187/29 |
| 4,142,609 | 3/1979 | Tachino | 187/29 |
| 4,193,478 | 3/1980 | Keller et al. | 187/29 |
| 4,246,983 | 1/1981 | Bril | 187/29 |
| 4,337,847 | 7/1982 | Schröder et al. | 187/29 |
| 4,341,287 | 7/1982 | Kuzunuki et al. | 187/29 |

Primary Examiner—G. Z. Rubinson
Assistant Examiner—W. E. Duncanson, Jr.
Attorney, Agent, or Firm—Sughrue, Mion, Zinn, Macpeak and Seas

[57] ABSTRACT

An elevator speed instruction generating system using an electronic computer to generate speed instruction data comprises a pulse generator adapted to generate a pulse whenever the cage runs a predetermined distance, a counter for subjecting the pulse thus generated to addition and subtraction according to the travelling direction of the cage, and memory means provided in the electronic computer for storing acceleration and deceleration instruction data. Acceleration instruction data are read out of the memory means every predetermined time in the acceleration operation, and in the deceleration operation deceleration instruction data corresponding to the differences between the absolute position of a destination floor and outputs of the counter are read. Adjustment of the elevator, which is required when it is installed in different buildings, can be achieved merely by changing the data stored in the memory means.

7 Claims, 18 Drawing Figures

FIG. 3

| ADDRESS | DATA |
|---|---|
| VDI | $D_{c0}$ |
| VDI + 1 | $D_{c1}$ |
| VDI + 2 | $D_{c2}$ |
| VDI+i−1 | $D_{ci-1}$ |
| VDI + i | $D_{ci}$ |
| VDI+i+1 | $D_{ci+1}$ |
| VDI + e | $D_{ce}$ |
| VAI | $D_{a0}$ |
| VAI + 1 | $D_{a1}$ |
| VAI + 2 | $D_{a2}$ |
| VAI+j−1 | $D_{aj-1}$ |
| VAI + j | $D_{aj}$ |
| VAI+j+1 | $D_{aj+1}$ |
| VAI + m | $D_{am}$ |
| SFL | $S_0$ |
| SFL + 1 | $S_1$ |
| SFL + 2 | $S_2$ |
| SFL + l | $S_l$ |
| SFL + n | $S_n$ |

FIG. 4(a)
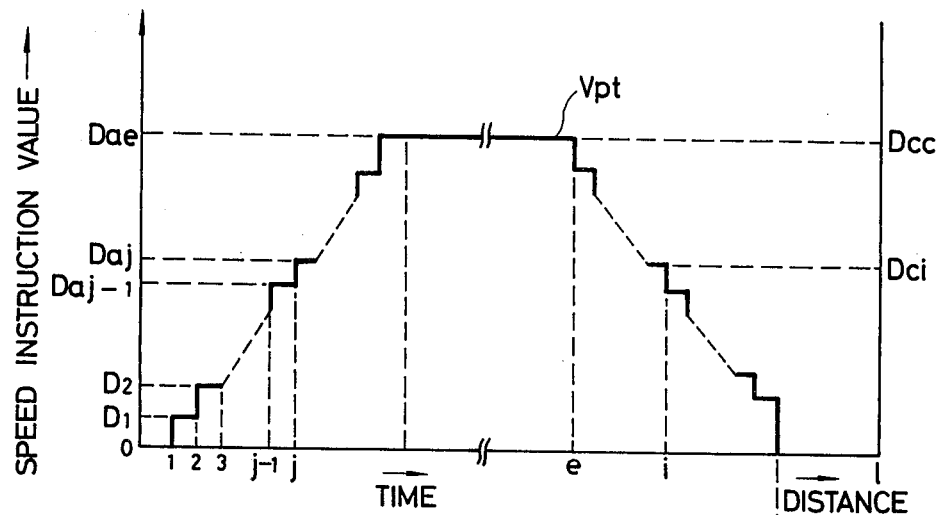
FIG. 4(b)
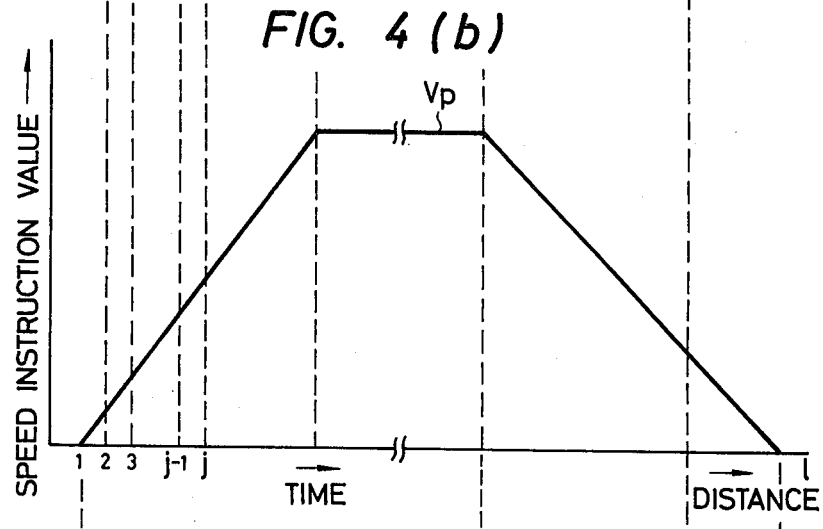
FIG. 4(c)

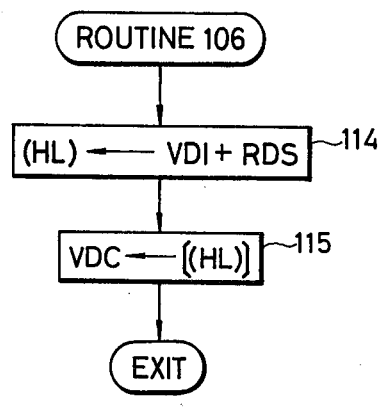
FIG. 11
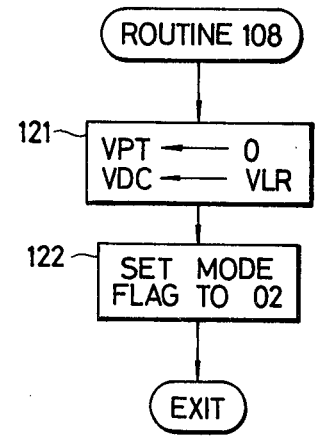
FIG. 12
FIG. 13
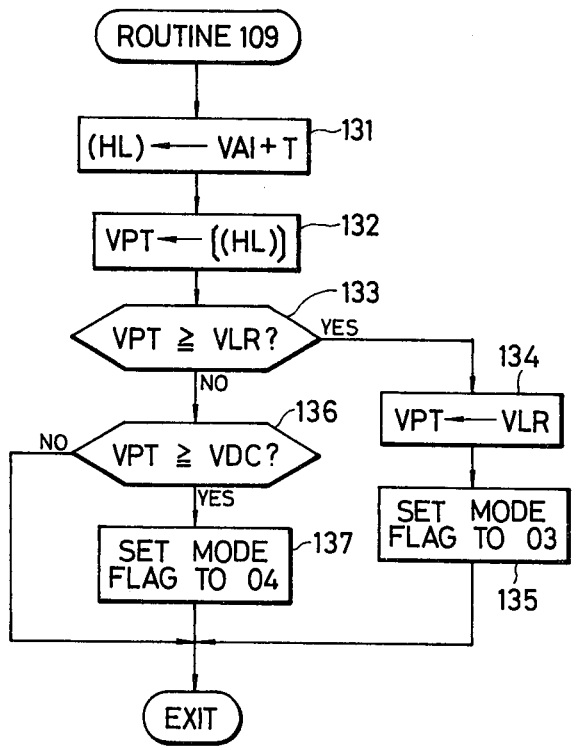

ELEVATOR SPEED INSTRUCTION GENERATING SYSTEM

BACKGROUND OF THE INVENTION

1. Field of the Invention

This invention relates to an improvement in a speed instruction generating system for an elevator, which use an electronic computer to generate speed instruction data for the elevator.

2. Description of the Prior Art

Heretofore, for an elevator to run smoothly, the acceleration operation has been controlled according to the difference between an acceleration instruction signal increasing with time and an output signal of a tachometer generator coupled to the elevator cage, and the deceleration operation has been controlled according to the difference between the output of the tachometer generator and a deceleration instruction signal which decreases as the cage approaches the desired floor.

In order to improve the deceleration characteristics, it is necessary to provide a number of position data for the deceleration instruction data signal. In order to meet this requirement, the use of a number of expensive position detectors is necessary, which results in an increase in manufacturing cost and a decrease in reliability.

In order to overcome this difficulty, a method has been proposed in which a signal proportional to a speed of a hoisting motor is counted, or integrated. The result of the count is decoded by a decoder, the output of which is stored by a latch circuit, so that the signals proportional to the speed of the motor are accumulated to detect a cage position, to thereby reduce the number of position detectors.

In such a system, when a signal proportional to the speed of the hoisting motor is inputted, the counter is made ready for counting the signal, but the system is arranged so that the signal proportional to the speed of the motor is not inputted to the counter until the cage has reached a deceleration start point; that is, when the cage has reached the deceleration start point, the signal is then inputted so as to be counted, to thereby detect the cage position.

However, it should be noted that in such a system, from the view point of the passenger's comfort, the deceleration pattern should be determined so that the acceleration and deceleration are substantially constant, and therefore the relation between the cage stopping distance and the speed is substantially a square root curve. Accordingly, adjustment of the counter and decoder which counts the pulses to provide a speed curve is intricate, which unavoidably results in a significant increase in the manufacturing cost.

SUMMARY OF THE INVENTION

Accordingly, an object of this invention is to provide a speed instruction generating system for an elevator which is simple in construction and can perform speed control with high accuracy.

Another object of the invention is to provide a speed instruction generating system for an elevator which, when installed in an elevator system in a different building, can be readily adjusted so as to be matched with that building.

A further object of the invention is to provide a speed instruction generating system for an elevator which can positively detect the present position of the cage even when a main power supply, i.e. a commercial power supply, is interrupted.

The foregoing objects and other objects of the invention have been achieved according to this invention by the provision of a speed instruction generating system for an elevator, in which an acceleration instruction data signal increasing with time and a deceleration instruction data signal which decreases as the cage approaches a desired floor where the cage should be stopped are generated through the operation of an electronic computer. According to this invention, whenever the cage travels a predetermined distance, a pulse is generated by pulse generating means provided separately from the electronic computer, the pulse thus generated is subjected to addition and subtraction separately according to the direction of travel, and in the acceleration operation acceleration instruction data are read out of a speed instruction storing means every predetermined period of time, while in the deceleration operation deceleration instruction data are read out of the speed instruction storing means corresponding to differences between the counter output and the absolute position of a destination floor which is stored in a floor position storing means.

BRIEF DESCRIPTION OF THE DRAWINGS

The nature, principle and utility of the invention will become more apparent from the following detailed description and the appended claims when read in conjunction with the accompanying drawings, in which:

FIG. 3 is an explanatory diagram showin data in a ROM in FIG. 2;

FIG. 4 is a diagram indicating the operation of the electronic computer;

FIG. 11 is a flow chart indicating the routine 106 in FIG. 10 for extracting deceleration instruction data;

FIG. 12 is a flow chart indicating the standby mode routine 108 in FIG. 10;

FIG. 13 is a flow chart indicating the acceleration mode routine 109 in FIG. 10;

DETAILED DESCRIPTION OF THE PREFERRED EMBODIMENTS

Figure 1:
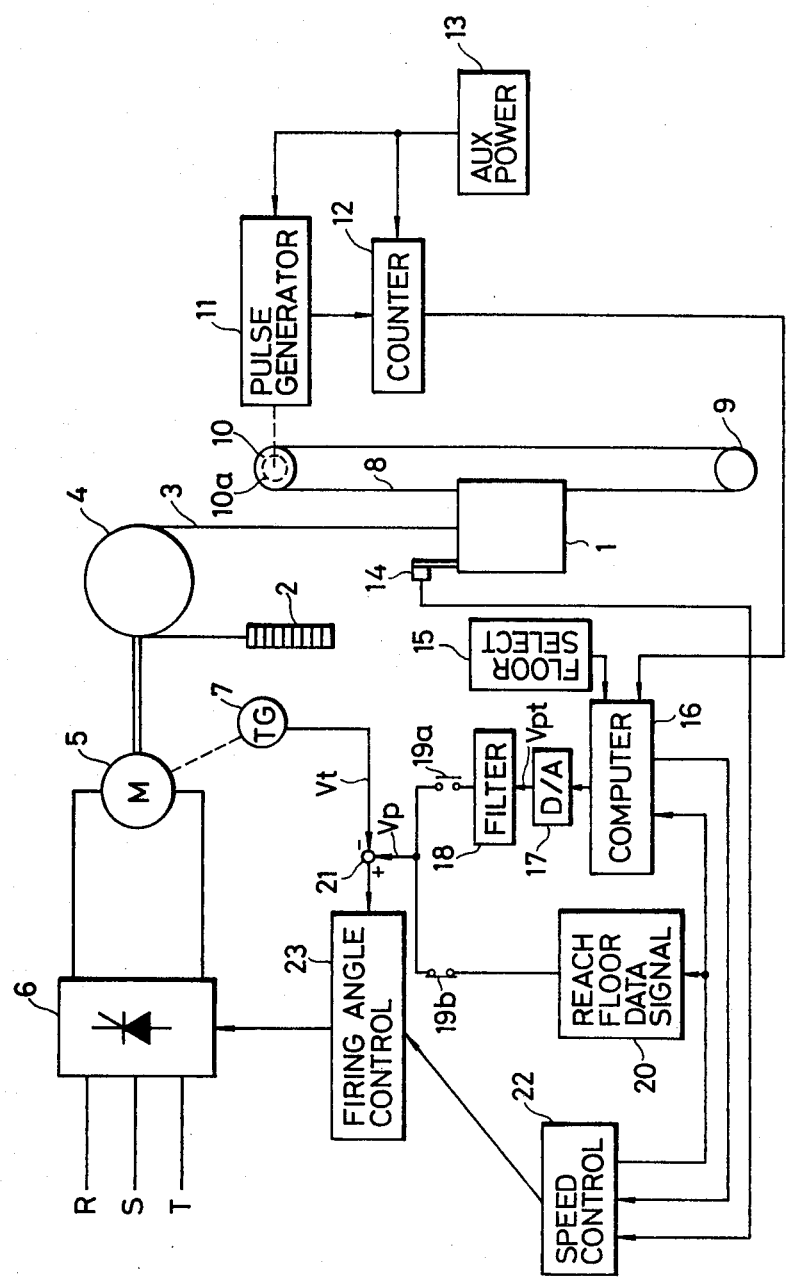
FIG. 1 is an explanatory diagram showing the arrangement of one example of a speed instruction generating system for an elevator according to this invention.

One example of a speed instruction generating system according to this invention is as shown in FIG. 1.

In FIG. 1, reference numeral 1 designates the cage of an elevator; 2, a counterweight; 3, a main rope; 4, the sheave of a hoisting unit; 5, the armature of a dc motor coupled to the sheave 4 (the filed being not shown); 6, a convertor comprising thyristors for instance, to convert the alternate currents of three phase ac sources R, S and T into direct currents; 7 a tachometer generator driven by the armature 5; 8, a rope both ends of which are connected to the cage 1, thus forming a kind of endless rope; 9, a tension wheel provided at the bottom of the elevator path, or a shaft, to provide tension to the rope 8; 10, a disk on which the rope 8 is laid, the disk 10 being disposed in a machine room and having small holes 10a formed in its cylindrical wall at equal intervals; 11, a position pulse generator which outputs a pulse whenever it detects each small hole 10a; 12, a counter which subjects the above-described pulses to addition when the cage 1 is moved upwardly and to subtraction when the cage 1 is moved downwardly, to thereby detect the present position of the cage through counting; and 13, an auxiliary power source such as a battery for feeding electric current to the position pulse generator 11 and the counter 12 even when the power supply is interrupted.

Further in FIG. 1, reference numeral 14 designates a position detector provided on the cage 1, the position detector 14 being activated when confronted with an engaging piece (not shown) which is provided in the shaft and near an appointed floor which is the destination for the cage (hereinafter referred to as "an appointed floor"); 15, a floor selecting device for determining a floor where the cage should be stopped; 16, a small electronic computer such as a microcomputer; 17, a D/A (digital-to-analog) converter for converting digital speed instruction data outputted by the electronic computer 16 into analog data; 8, a filter circuit for smoothing the output Vpt of the D/A converter; 19a, a normally-open contact means of a reach floor relay (not shown) which is energized before the cage 1 starts and is deenergized when the position detector 14 operates to indicate that the appointed floor is near; 19b, a normally-closed contact means of the relay; 20, a reach floor instruction generating device which operates in a known manner to generate a reach floor data signal which is decreased as the cage approaches an appointed floor, depending on the positional relation between the position detector 14 and the engaging piece; 21, an adder; 22, a speed control device; 23, a firing angle control device for controlling the converter 6; Vp, a speed instruction data signal; and Vt, a speed signal.

Figure 2:
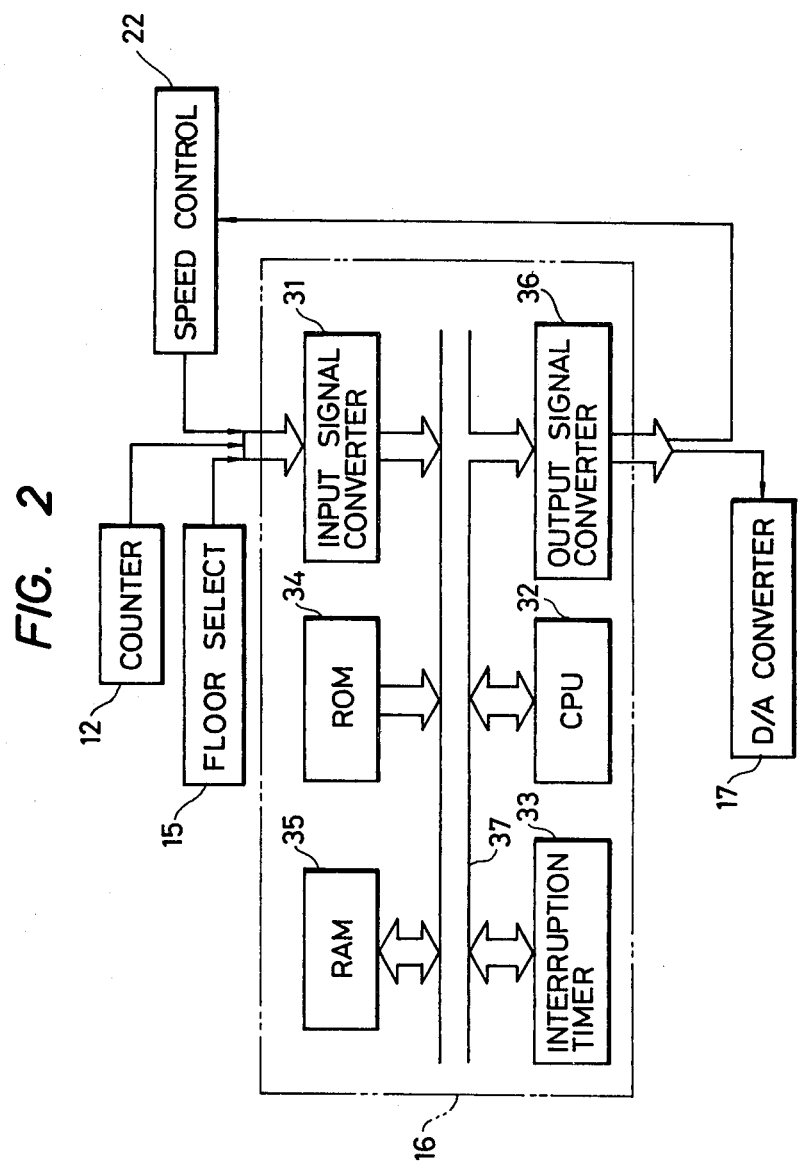
FIG. 2 is a block diagram showing the arrangement of an electronic computer in FIG. 1.

The aforementioned electronic computer 16, as shown in FIG. 2, comprises; an input converter 31 for converting inputs into data for the electronic computer 16; a central processing unit 32; an interruption period controlling timer 33; a ROM (read-only memory) 34 in which programs, acceleration instruction data, deceleration instruction data and absolute floor position data are written; a RAM (random access memory) 35 for storing data in the memory addresses; an output converter 36 for converting the data of the electronic computer into signals for the elevator equipment; and a bus assembly 37 consisting of address and data buses.

In FIG. 3, reference numeral 38 designates the deceleration instruction data; 39, the acceleration instruction data; and 40, the absolute floor position data which represent the floor positions as absolute values from a reference position. These data are written in respective addresses in the ROM 34.

In FIGS. 4(a) and 4(b), reference characters 1, 2, 3, . . . and e indicate the time axis, and reference characters e . . . and l indicate the distance axis. In FIG. 4(c), reference character 01 designates a standby mode; 02, an acceleration mode; 03, a constant speed mode; 04, a deceleration mode; and 05, a reach floor mode.

In FIGS. 5 through 16, reference numerals 51 through 53, 61 through 64, 71 through 74, 81 through 83, 91 through 94, 101 through 113, 111 and 112, 121 and 122, 131 through 137, 141 through 134, 151 and 161 designate operation steps.

The operation of the speed instruction generating system thus organized will now be described. As conductive to a full understanding of the invention, the operation will first be outlined.

When a call from a floor is registered to apply a start instruction to the cage 1, the computer 16 signals the speed control device 22 to enable the circuit 23, and a speed instruction data Vpt, which as shown in FIG. 4(a) includes a speed instruction data signal corresponding to the acceleration mode 02 which increases with time, is also issued through the D/A converter 17 by the electronic computer 16. In this case, the contact means 19b and 19a of the reach floor relay are opened and closed, respectively. Therefore, the speed instruction data thus issued is converted into a smooth speed instruction data signal Vp by the filter circuit 18, which is applied to the firing angle control device 23. The device 23 has been enabled by the speed control circuit 22 and as a result, a voltage developed by the converter 6 is applied to the armature 5 to start the latter 5. When the armature 5 is started in this manner, then the cage is started through the sheave 4 and the main rope 3. The tachometer generator 7 outputs a speed signal Vt corresponding to the speed of the armature 5 and accordingly to the speed of the cage 1. The speed signal Vt is compared at 21 with the speed instruction data Vp, to automatically control the speed of the cage 1 with high accuracy.

On the other hand, the movement of the cage 1 is transmitted through the rope 8 to the disk 10, as a result of which is position pulse generator 11 outputs pulses which are subjected to addition or subtraction by the counter 12. The count value of the counter 12 is applied to the computer 16, so that the present position of the cage 1 is detected. Therefore, the difference between the present position of the cage 1 and the absolute position of the appointef floor which is indicated by the floor selecting device 15, i.e., the remaining distance to the appointed floor, is calculated at all times, and a deceleration instruction data signal for the remaining distance is calculated.

When the speed of the elevator reaches the rated speed, the acceleration signal no longer increases, and the system operates in the constant speed mode with the cage 1 running at the rated speed. This mode continues until the acceleration instruction data signal (which is constant in this case) becomes equal to the decleration instruction data signal, at which time the speed instruction signal begins decreasing according to the deceleration mode 04. Thus, the speed of the cage is decreased in accordance with the decrease in the speed instruction data signal Vpt. When the cage 1 approaches the appointed floor, the position detector 14 operates, and the contact means 19a and 19b of the reach floor relay are opened and closed, respectively. As a result, the speed instruction data signal Vpt is replaced by the output of the reach floor instruction signal from a generating device 20, so that the reach floor mode 05 is effected, and the cage 1 reaches the appointed floor with high accuracy. The reach floor data signal generating device 20 is of a type well known in the art and will not be described in further detail herein.

Since the position pulse generator 11 and the counter 12 are fed by the auxiliary power source 13 such as a battery, the present position of the cage 1 can be detected at all times even if the commercial power supply is interrupted.

The operation of the speed instruction generating system, and specifically the operation of the electronic computer 16, will now be described in more detail with reference to flow charts.

Figure 5:
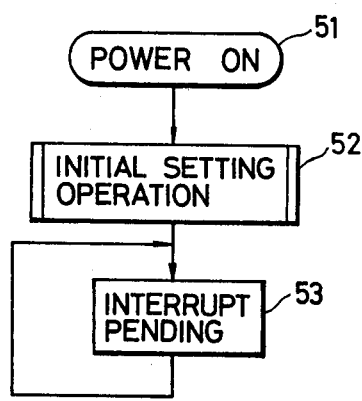
FIG. 5 is a flow chart indicating the operation of the electronic computer.

The electronic computer 16 operates according to a program as shown in FIG. 5, which is stored in the ROM 34. That is, when the power switch is turned on to start the electronic computer 16 in step 51, the routine 52 is automatically effected to perform an initial setting operation, and then the interruption routine 53 is performed at predetermined intervals determined by the timer 33 in FIG. 2.

Figure 6:
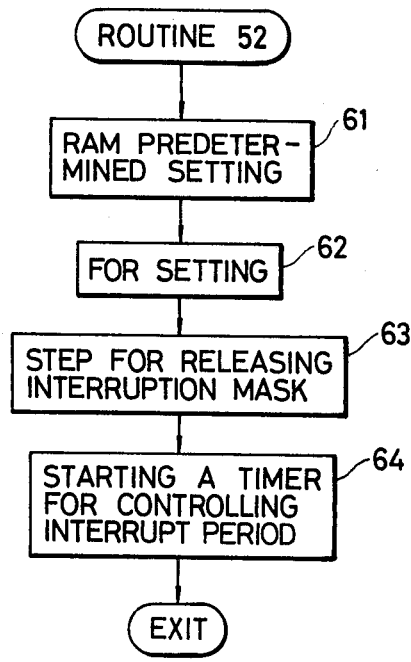
FIG. 6 is a flow chart indicating an initial setting routine 52 in FIG. 5.

As shown in FIG. 6, the initialization routine involves merely setting up the RAM and beginning the interruption timing.

Figure 7:
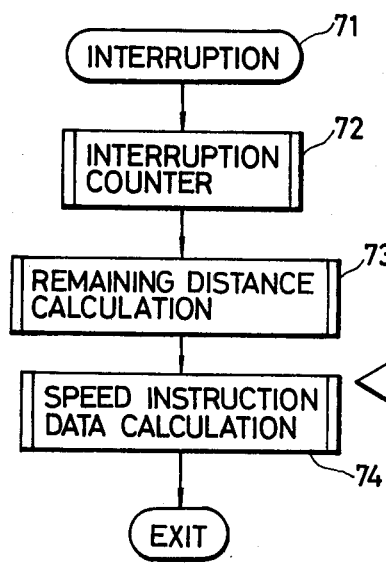
FIG. 7 is a flow chart indicating a routine which is performed when interruption is made from a timer.

FIG. 7 shows that, when interruption is made by the timer 33 in step 71, the following program, i.e., routine 72 for counting the number of interruptions, routine 73 for calculating the distance remaining to the appointed floor, and routine 74 for speed instruction data calculation, are performed in order.

Figure 8:
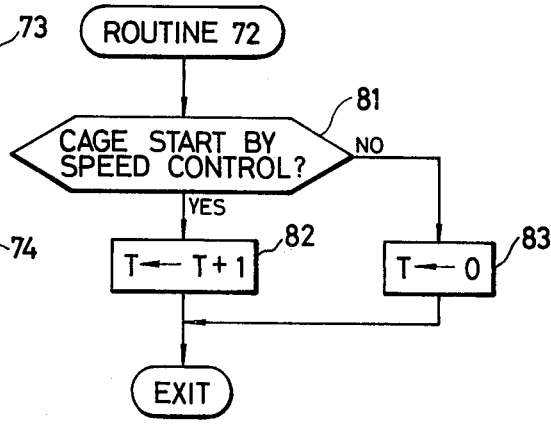
FIG. 8 is a flow chart indicating the routine 72 in FIG. 7 for counting the number of interruptions.

In routine 72, as shown in FIG. 8, when the cage 1 is started by an input signal from the speed control device 22 in step 81, then the content of a variable T is increased by one in step 82. If the cage 1 is maintained stopped, the variable T is set to zero (0) in step 83.

Figure 9:
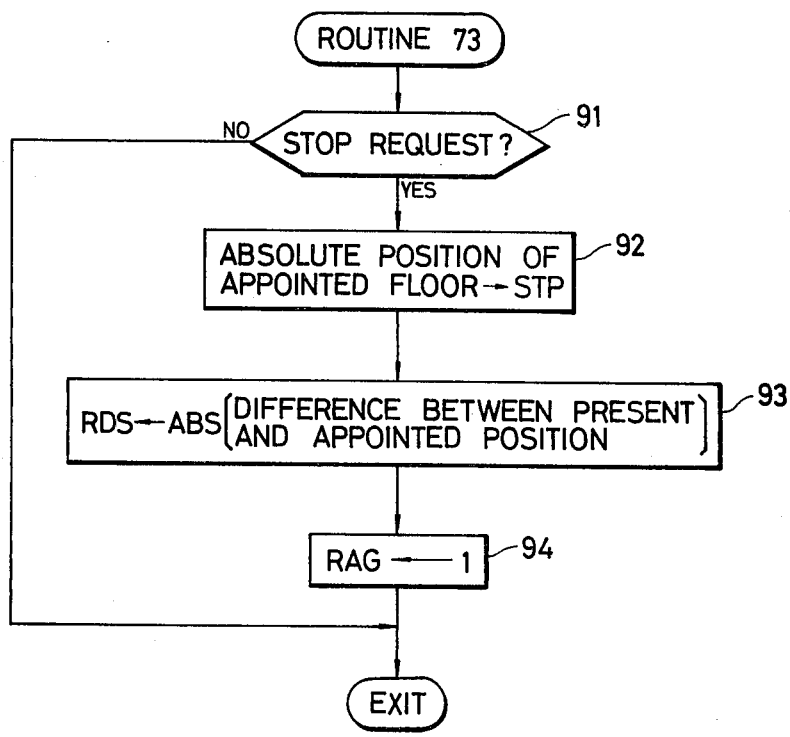
FIG. 9 is a flow chart indicating the routine 73 in FIG. 7 for calculating a remaining distance.

Routine 73 for calculating a remaining distance is shown in detail in FIG. 9. When a floor where the cage should be stopped is determined from the floor selecting device 15, the data representative of that floor is received by the electronic computer 16 through the input converter 31. In step 91 the presence or absence of a stop request is determined. If there is not stop request, i.e., no appointed destination floor, the elevator cage will remain idle in its standby mode. If a stop request is available, the absolute position data 40 of the appointed floor is extracted in step 92 from the respective address in the ROM 34, and the data thus extracted is stored as a data STP in a predetermined address in the RAM 35. In step 93, the count value of the counter 12, representative of the present position of the cage, is inputted, and the absolute value of the difference between the count value and the data STP is stored as a remaining distance data RDS in a predetermined address in the RAM 35. In step 94, a flag RAG representative of the remaining distance calculation start is set to "1".

Figure 10:
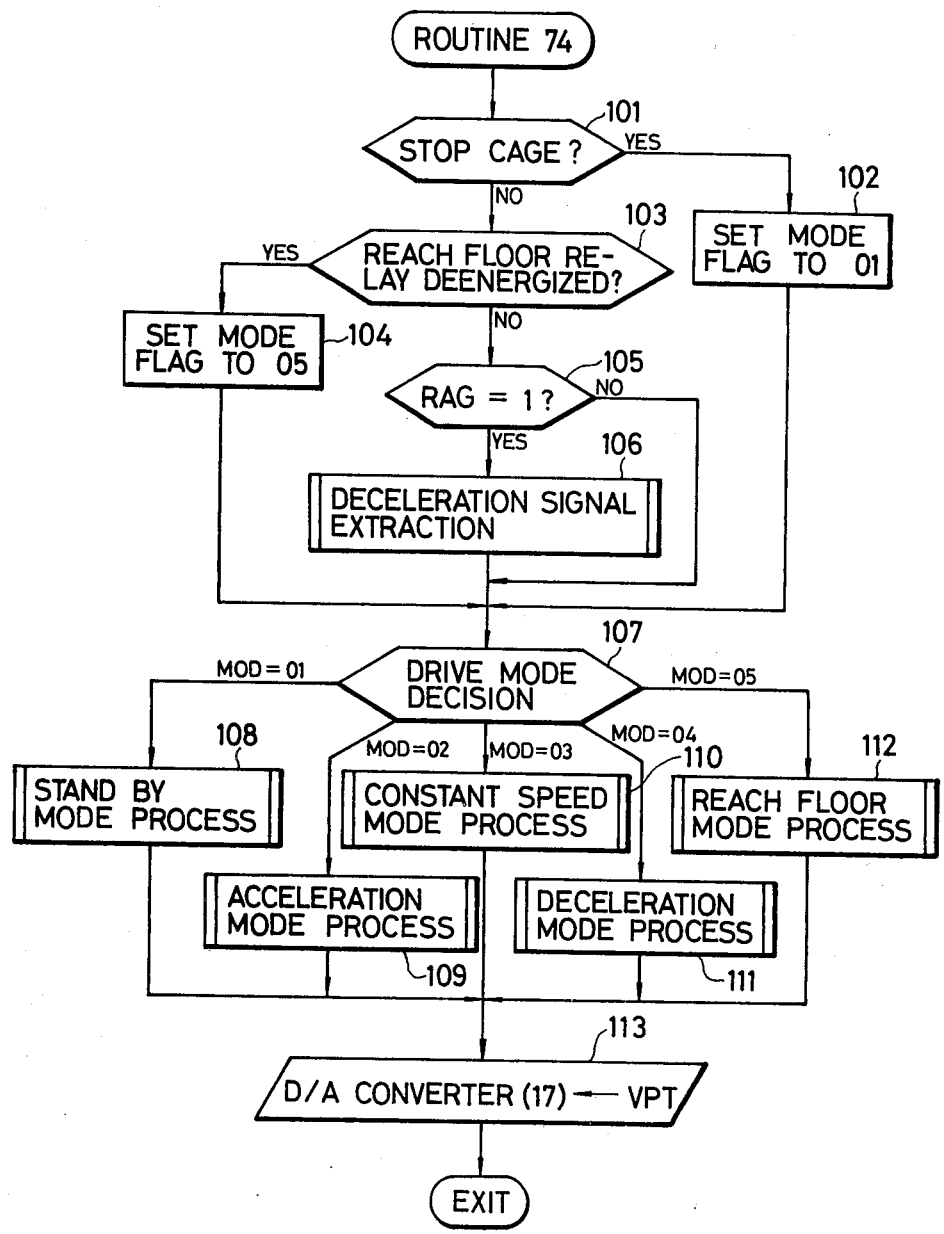
FIG. 10 is a flow chart indicating the routine 74 in FIG. 7 for calculating speed instruction data.

In routine 74 for speed instruction data calculation, the operation is effected as indicated in FIG. 10. In step 101, it is discriminated whether or not the cage 1 is being stopped. If the cage 1 is stopped, then the operation mode flag MOD is set for the standby mode 01 in step 102. If the cage 1 is not stopped, the next step 103 is effected, in which it is detected whether or not the reach floor relay, which is deenergized when the position detector 14 approaches the appointed floor, is deenergized. If the relay is deenergized, then in step 104 the flag MOD is set for the reach floor mode 05. If the system is in neither of modes 01 or 05, then in step 105 the state of the distance calculation flag RAG is detected. If the flag RAG is set to "1", i.e., if the remaining distance calculation has been started in routine 73, then extraction of a deceleration instruction data signal is carried out in routine 106.

In step 107, the state of the operating mode flag MOD is detected. If MOD=01, then the standby mode routine 108 is performed; if MOD=02, then the acceleration mode routine 109 is performed; if MOD=03, the constant speed mode routine 110 is performed; if MOD=04, the deceleration mode routine 111 is performed; and if MOD=05, the reach floor mode routine 112 is performed. Finally, in step 113 the data Vpt is applied to the D/A converter 17. Thus, a series of processes have been accomplished.

The aforementioned routine 106 for extracting a deceleration instruction data is indicated in FIG. 11 in detail. In step 114, the sum of the data in the top address VDI of the deceleration instruction data 38 stored in the ROM 34 and the remaining distance data RDS is loaded in an index register HL. In the next step 115, the deceleration instruction data 38 is extracted from the address specified by the index register, and is then stored, as a deceleration instruction data VDC, in a predetermined address of the RAM 35.

FIGS. 12 through 16 show the various operating mode routines in detail.

FIG. 12 indicates the O1 standby mode routine 108 in FIG. 10. In step 121, the desired output Vpt of the D/A converter stored in the predetermined address in the RAM 35 is reset to zero, and the data VDC is set to the rated speed VLR. In step 122, the operating mode flag MOD is set for the acceleration mode 02.

FIG. 13 indicates the 02 acceleration mode routine 109 in FIG. 10. In step 131, the sum of the variable T stored in the RAM 35 in routine 72 and the data in the top address VAI of the acceleration instruction data 39 is loaded in the index register HL. In step 132, acceleration instruction data 39 is extracted out of the address specified by the index register and is then stored as Vpt data in the RAM 35. In the next step 133, the data Vpt is compared with the rated speed VLR. If Vpt≧VLR, then step 134 is effected to set the data Vpt to VLR. Then, in the next step 135, the flag MOD is set for the constant speed mode 03. If Vpt<VLR, step 136 is effected, to compare the deceleration instruction data VDC with the data Vpt. If Vpt≧VDC, then in the next step 137 the flag MOD is set for the deceleration mode 04. If Vpt<VDC, then step 137 is omitted. Thus, the acceleration mode (02) routine 109 has been accomplished.

Figure 14:
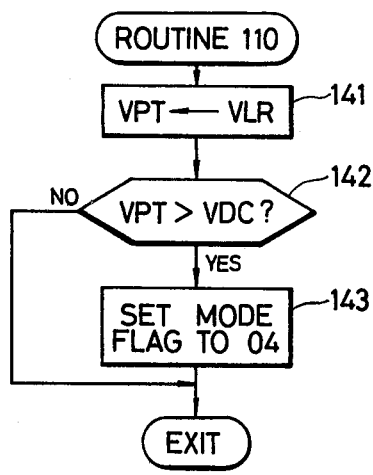
FIG. 14 is a flow chart indicating the constant speed mode routine 110 in FIG. 10.

FIG. 14 indicates the 03 constant speed mode routine 110 in FIG. 10 in detail. In the step 141, the data Vpt is maintained at the rated speed VLR. In step 142, Vpt is compared with VDC. If Vpt≧VDC, the flag MOD is set for the deceleration mode 04 in step 143; and if not, step 143 is omitted. Thus, the constant speed mode routine 110 has been accomplished.

Figure 15:
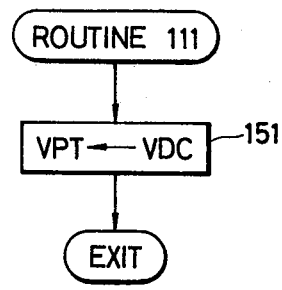
FIG. 15 is a flow chart indicating the deceleration mode routine 111 in FIG 10.
Figure 16:
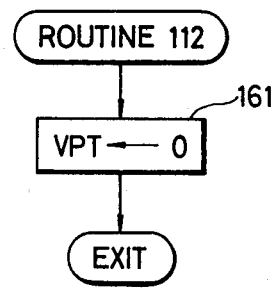
FIG. 16 is a flow chart indicating a reach floor mode routine 112 in FIG. 10.

The deceleration mode (04) routine 111 in FIG. 10 is indicated in detail in FIG. 15. This routine 111 includes only one step 151 in which the deceleration instruction data VDC is read out of the predetermined address in the RAM 35 and is set as the Vpt data.

After the reach floor relay has been deenergized, the speed control circuit 22 indicates to the computer 16 and reach floor data signal generator 20 that the speed instruction data Vpt should be replaced by the instruction data outputted by the reach floor instruction generating device 20 so that the cage 1 reaches the appointed floor smoothly. For this purpose, in the reach floor mode (05) routine 112 in FIG. 10, only step 161 is effected to reset the data Vpt to zero as shown in FIG. 10.

With the above-described software arrangement, upon provision of a start signal by the speed control device 22, the reach floor relay is energized and the elecronic computer 16 carries out step 81 in FIG. 8, and the number of interruptions is counted in step 82. The floor for which a stop request is made, namely, an appointed floor (for instance the l-th floor) is detected by the floor selecting device 15, and both the stop request and the l-th floor information are forwarded to the electronic computer 16. Then, the address SFL+1 for the table of FIG. 3 is specified by the index register HL in step 92 in FIG. 9, so that the absolute solution $S_l$ of the appointed floor is extracted from the data 40 and is stored as a data STP. In step 93, the remaining discance RDS to the appointed floor is calculated. Upon provision of the stop request, the flag RAG is set to "1" in step 94, and therefore computer 16 follows the center flow path of the upper part of FIG. 10 and the extraction of the deceleration instruction data is started in routine 106. In other words, in steps 114 and 115 in FIG. 11 the deceleration instruction data VDC is extracted from the data 38. If it is assumed that a deceleration distance for which the rated speed is decelerated is represented by e. Then, data Dce is first extracted. As the remaining distance RDS decreases as the cage 1 runs, the deceleration speed instruction data changes as Dce ... Dci ... Dci-1 and so forth in the stated order.

Before the start signal was provided, the operating mode flag MOD has already been set for the acceleration mode 02 in routine 108 in FIG. 12. Therefore, when the computer reaches step 107, it follows the 02 path and routine 109 in FIG. 13 is carried out. When routine 109 is initially carried out, the variable T is one (1). Therefore, the address VAI+1 is specified by the index register. In step 132, the data Da1 from the address VAI+1 in FIG. 3 is stored as the desired speed instruction data Vpt. The data Vpt is applied to the D/A converter 17 is step 113. Thereafter, the variable T is increased by one (1) every interruption period. Therefore, the data signal gradually increases to Da2, ... Daj-1, Daj, Daj+1 and so forth in the stated order. The output of the D/A converter 17 increases as shown in FIG. 4(a), and the output Vp of the filter circuit 18 increases with time as shown in FIG. 4(b). When the data Vpt increases to the level of the rated speed VLR, the operating mode is shifted to the constant speed mode 03 through steps 133, 134 and 135 in FIG. 13, and in step 141 in FIG. 14 the speed instruction data is maintained at the rated speed VLR.

As was described before, in step 142 of the constant speed mode (03) routine in FIG. 14, Vpt is compared with VDC. As VDC decreases, at some point if becomes smaller than Vpt, and the operating mode is set for the deceleration mode 04 in step 143. Then, in the next pass through the flow chart of FIG. 10, the 04 path is followed at step 107 and in step 151 of FIG. 15 the deceleration instruction data VDC is set as the output Vpt applied to the D/A converter 17. The speed instruction data signal then decreases as the remaining distance decreases, as shown in FIGS. 4(a) and 4(b).

When the cage 1 approaches the l-th floor, the position detector 14 is operated to deenergize the reach floor relay, and the computer during the next interruption follows the left branch from step 103 and then follows the 05 path of step 107 so that the Vpt value is set to zero and the speed instruction data Vp is provided instead by the reach floor instruction generating device 20. Thus, the cage 1 reaches the l-th floor with high accuracy.

In the case where the cage runs a relatively short distance, it may be necessary to decelerate before the rated speed is achieved. In this case, in step 136 the acceleration instruction data Vpt is compared with the deceleration instruction data VDC. When Vpt≧VDC, the acceleration mode 02 is ended, and the operating mode is set to the deceleration mode 04. Then, the deceleration instruction data is extracted at steps 114 and 115 and is outputted from the computer through steps 151 and 113. Thus, an optimum speed instruction data signal can be calculated according to the remaining running distance.

In the arrangement of this invention, unlike the conventional one in which the circuits for generating acceleration instruction data and deceleration instruction data are switched by the relay contact means, the data shown in FIG. 3 are successively applied to the D/A converter 16 by using one and the same circuit, to produce the speed instruction data Vp. Accordingly, the conventional analog circuits such as an acceleration instruction generating circuit, a deceleration instruction generating circuit and a short distance operating circuit, and the conventional switching circuit for switching these circuits are eliminated according to this invention. This will simplify the speed instruction generating system and improve the reliability thereof.

Furthermore, adjustment according to floor distance in individual buildings where elevators are installed can be achieved merely by changing the data stored in the ROM 34, according to this invention.

Heretofore, adjustment of an elevator system has been carried out in a hardware sense, for instance by adjusting the capacity of the hoisting motor, the power frequency and the diameter of the sheave; however, it can be achieved by merely changing the data in the ROM 34 according to this invention.

What is claimed is:

1. In an elevator system including a cage movable in first and second directions between a plurality of floors at different positions along an elevator path, and moving means for moving said cage at a speed determined by a speed instruction data signal, said speed instruction data signal comprising an acceleration instruction data signal when operating in an accelerating mode and a deceleration instruction data signal when operating in a decelerating mode, a speed instruction signal generating system comprising:

a computer;

pulse generating means provided separately from said computer for generating a pulse whenever said cage travels a predetermined distance;

counter means connected to said pulse generating means for counting said pulses upwardly when said cage travels in said first direction and for counting said pulses downwardly when said cage travels in said second direction;

floor position storing means for storing at respective addresses data corresponding to the absolute positions of each of said plurality of floors with respect to a reference position;

speed instruction storing means provided in said electronic computer for storing at respective addresses a plurality of acceleration data corresponding to different desired speeds of said cage during operation in said acceleration mode and for storing at respective addresses a plurality of deceleration data corresponding to different desired speeds of said cage during operation in said decelerating mode;

comparison means in said computer for comparing the position of said cage indicated by the value in said counter with the absolute position of an appointed floor at which said cage is to be stopped to thereby detect a remaining distance value; and read out means in said computer for reading out increasing values of said acceleration data to said moving means as said acceleration instruction data signal during said accelerating mode and for reading a sequence of said deceleration data out of said speed instruction storing means as said deceleration instruction data signal to said moving means during said decelerating mode, the values of said sequence of decelerating data corresponding to said remaining distance value.

2. A speed instruction signal generating system as claimed in claim 1, further comprising an auxiliary power source for energizing said pulse generating and counting means regardless of the supply of power to the remainder of said system.

3. A speed instruction signal generating system as claimed in claim 1, wherein said values of acceleration data read out are increased at predetermined time intervals.

4. A speed instruction signal generating system as claimed in claim 1, wherein said read out means comprises means for calculating a deceleration address signal in accordance with said remaining distance value and for supplying said deceleration address signal to said speed instruction storing means.

5. A speed instruction generating system as claimed in claim 1, wherein said deceleration instruction data signal is provided as said speed instruction data signal whenever said deceleration instruction data signal is less than the present value of siad speed instruction data signal.

6. A speed instruction generating system as claimed in claim 4, further comprising:
a separate source of data signals; and
relay means activated when said cage approaches within a predetermined distance of said appointed floor, said relay means providing data read out of said speed instruction storing means as said speed instruction data signal until activated, and providing data signals from said separate source of data signals as said speed instruction data signals after activation until said cage has stopped at said appointed floor.

7. A speed instruction generating system as claimed in claim 1, wherein said cage is permitted to move at a maximum rated speed, and a data signal corresponding to said maximum rated speed is supplied as said speed instruction data signal whenever the maximum rated speed is less than the values of said acceleration instruction data signal and said deceleration instruction data signal.

* * * * *